Patented May 12, 1936

2,040,167

UNITED STATES PATENT OFFICE 2,040,167

SLAG AND AGITATION HEAT TREATMENT OF METALS

Edwin L. Crosby, Detroit, Mich., assignor to Detroit Electric Furnace Company, Detroit, Mich., a corporation of Michigan No Drawing. Application December 29, 1933, Serial No. 704,515

4 Claims. (Cl. 75—93)

This invention relates to a method of purifying metals.

More specifically, this invention relates to the slagging off of impurities in metals by superheat and mechanical agitation treatment.

In the refining of metals, such as the refining of iron for steel production, impurities in the iron, such as sulphur and phosphorus, are removed by incorporating slag forming materials, such as limestone, sand, fluorspar and the like, into a molten metal bath in a refining furnace, such as an open hearth furnace. A slag is formed which is composed of phosphates, sulphides, oxides and other impurities taken from the metal bath. The slag being lighter than the metal floats on top of the molten metal and may be tapped off before the metal is poured.

I have now found that the purification of metals by the slag process may be rendered more efficient and greatly speeded up by intimately mixing the slag forming ingredients with metals to be purified in the cold or solid state, then melting the metal and agitating the metal bath while allowing the slag to form. The agitation maintains an intimate association of the slag with all parts of the metal and brings about a more rapid and effective purifying action. The slag is then removed and the metal may be further agitated and superheated as will be more fully hereinafter described.

It is, therefore, an object of this invention to purify metals by superheat and agitation treatment.

It is a further object of this invention to refine metals by intimately associating such metals with slag forming ingredients capable of removing the impurities from the metals.

Another object of this invention is to provide a process for completely removing all slag particles from the metals.

Another object of this invention is to refine ferrous metals by a slag purification process in which all of the slag particles are removed from the metals.

Other and further objects of this invention will be apparent to those skilled in the art from the following specification and claims which form a part of this description.

In accordance with my invention, the metal to be purified is preferably intimately mixed with slag forming materials in the cold or solid state, although the slagging materials may be added to the molten metal. Any type of slag forming ingredients may be used to impart the desired special characteristics to the type of metal being purified. Thus, if I desire to purify a ferrous metal, slag forming ingredients, such as limestone, fluorspar and the like, are added.

The following example illustrates a form of my preferred process of purifying ferrous metals. It should be understood, however, that the process of this invention is not confined to any single metal, but may be used for refining all types of metals.

A charge of ferrous metals, made up of scrap-iron or steel broken pigs, metal borings, or any form of iron, is intimately mixed with the proper proportion of limestone. The proportion of limestone to metal will vary considerably due to the nature of the metal to be purified. This proportion can be determined for each individual charge in accordance with well-known metal refining processes. The mixture is charged into a Detroit rocking electric furnace which is of the indirect arc type. The mixture is then heated and melted. The molten metal is next agitated in the same furnace independently of the heating operation by mechanically oscillating the furnace. The furnace may be closed during the agitation treatment to prevent oxidation of the metal. This agitation maintains the slag materials in intimate association with all parts of the metal. Because of the intimate contact of the slag materials with the metal, a rapid and effective chemical purifying action occurs. When the metal has been substantially purified, the agitation action is stopped and the slag which floats on top of the metal is removed.

The electric furnace is again sealed from the atmosphere and the molten metal is superheated to temperatures above 2900° F. The superheat treatment is combined with a simultaneous independent agitation treatment by again rocking the furnace. The metal is in a highly fluid condition at the superheat temperatures and any occluded slag particles in the metal are loosened from the metal by the agitation treatment. These particles rapidly rise to the top of the metal bath through the highly fluid metal. Since the superheat and agitation treatments are carried out under reducing conditions by sealing the contents of the furnace from the atmosphere, deleterious oxides are removed and any segregated carbides are uniformly dispersed throughout the metal bath.

When the purification treatment has been completed, the furnace is again stopped, and the additional slag or gangue collected on top of the metal bath may be removed. The purified metal is now ready for pouring.

It should be understood that this process is preferably carried out in a Detroit rocking electric furnace, which is well known to the art, although other furnaces capable of superheating the metals while simultaneously agitating the same in the same container may be used.

I am aware that numerous details of the process may be varied through a wide range without departing from the principles of this invention, and I, therefore, do not purpose limiting the patent granted hereon otherwise than necessitated by the prior art.

I claim as my invention:

1. The process of purifying metals which comprises intimately mixing the metal to be purified with slagging materials, melting the mixture, agitating the melt to maintain the slag formed and metal in intimate association, stopping the agitation after the purifying action is substantially complete, removing the slag collected on top of the metal, superheating the molten metal to render the same more fluid, simultaneously agitating the fluid metal to float occluded slag particles, removing said particles and pouring the homogeneous purified metal.

2. The process of purifying metals which comprises forming a melt of the metal to be purified and slagging materials, mechanically agitating the melt to intimately contact the slag formed with all parts of the metal, stopping the mechanical agitation, allowing the slag to collect on top of the metal, removing the slag, superheating the metal to render the same more fluid, while simultaneously mechanically agitating the metal to float occluded slag particles and assure homogeneity of the metal, removing the slag particles, and pouring the fluid metal.

3. The process of purifying metals which comprises forming a melt of the metal to be purified and slagging materials, mechanically agitating the melt to intimately contact the slag formed with all parts of the metal, stopping the mechanical agitation, allowing the slag to collect on top of the metal, pouring off the slag, superheating under reducing conditions, and simultaneously mechanically agitating the metal to render the metal more fluid while deoxidizing the same and removing deleterious matter therefrom.

4. In the process of refining molten metal having a slag in contact therewith, the steps of intimately mixing said slag with said metal, allowing the slag to float off, superheating said metal and independently agitating the same to float off occluded slag particles, and pouring the purified metal.

EDWIN L. CROSBY.